Sept. 27, 1938.  A. N. SNYDER  2,131,077
APPLICATOR
Filed April 24, 1937
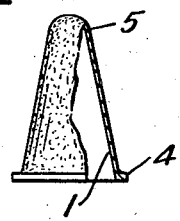
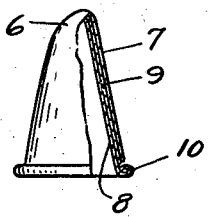
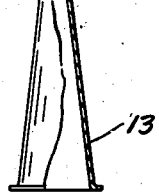
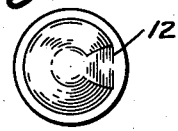
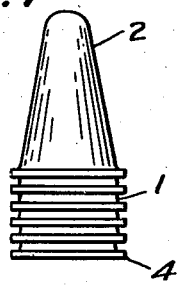
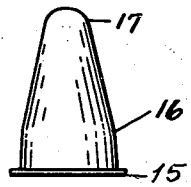
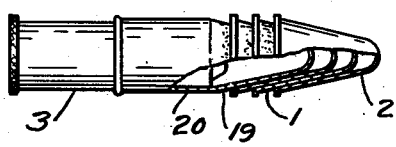
INVENTOR.
Arthur N. Snyder
BY James Harrison Bowen
ATTORNEY.

Patented Sept. 27, 1938

2,131,077

UNITED STATES PATENT OFFICE

2,131,077

APPLICATOR

Arthur N. Snyder, Jackson Heights, Long Island, N. Y.

Application April 24, 1937, Serial No. 138,867

8 Claims. (Cl. 132—1)

The purpose of this invention is to provide a device that may be used in place of the tip of a finger, handkerchief, or other article for spreading a substance on a surface, such as lipstick on the lips, which massages the substance into, or upon the surface, and does not merely force the substance over the surface, and in which the surface of the device is such that it takes up and retains surplus material, reserving it for future use, thereby eliminating waste.

The invention is a relatively thin tapering shell with a rounded point, having a surface of such a texture that it may be impregnated with lipstick material, facilitating spreading and massaging thereof. The device may be provided as a separate and independent unit, or a plurality of devices may be nested to form a stick with a master cap, and the stick may be fitted over the end of a lipstick case, forming the cap thereof. The individual devices may be used and discarded, or may be placed in the base to maintain holding means for the stick during use thereof. The master cap may also be placed in the base while the device is in use, and means may be provided for frictionally holding the different devices together.

Lipstick massaging devices have been incorporated in lipstick casings and provided independent thereof, however it has been found that in order to make such a device practical, the exact shape of the point, and the texture of the surface are very essential, and these devices must also be provided of inexpensive construction, so that they may readily be discarded after being used over a short period of time.

The object of this invention is, therefore, to provide a device for massaging lipstick, or any similar product, upon the lips, or upon any surface, in which the size of the device is such that it may readily be gripped and held as it is being used, and also in which the surface is of such a texture that it is readily impregnated with the lipstick, or the like, and also adapted to readily spread the said lipstick, or the like.

Another object is to provide an applicator adapted to spread and massage a substance upon a surface, in which a plurality of said devices may be nested to form a stick, in which the different devices and a cover therefor are held together by friction.

Another object is to provide a method of forming a surface upon a massaging device, in which the surface has spreading and massaging qualities.

A further object is to provide a massaging device adapted to be used for lipstick or the like, which is so constructed that a plurality of said devices may be incorporated in a lipstick.

And a still further object is to provide an applicator for massaging lipstick and other similar products, which is of a simple and economical construction.

With these ends in view the invention embodies an applicator having a relatively thin shell as hereinbefore described, with a relatively thin layer of cotton flock, or other suitable material, secured to the surface by a suitable adhesive forming a relatively soft surface adapted to be impregnated with a substance such as lipstick or the like, which is being applied or spread thereby, or adapted to take up surplus material, holding it in readiness for another application; and these devices may be nested to form a stick, or used in combination with a lipstick as hereinbefore described.

Other features and advantages of the invention will appear from the following description taken in connection with the drawing, wherein:

Figure 1 is a view showing the device in the preferred design with part broken away showing the interior hollow.

Figure 2 is a plan view of the device shown in Figure 1.

Figure 3 is a view similar to that shown in Figure 1, with part broken away, showing the thickness of the layers of material exaggerated.

Figure 4 is a plan view showing an alternate design, in which a groove is provided in one side of the device.

Figure 5 is a view similar to that shown in Figure 1, showing another alternate design, in which the device is made relatively long and tapering.

Figure 6 is a plan view showing another alternate design, in which the device is provided with a flat side.

Figure 7 is a view showing a plurality of the devices as shown in Figure 1 assembled to form a stick, and provided with a master cap forming a closure or covering for the device at the end of said stick.

Figure 8 is a view showing a device similar to that shown in Figure 1 of an alternate design, in which a relatively straight portion is provided adjacent the lower end to facilitate frictionally holding one device upon another.

Figure 9 is a similar view showing another alternate design, in which a small projection is provided at one side of the device to facilitate gripping and holding one device upon another.

Figure 10 is a view showing a plurality of the devices assembled upon a lipstick.

In the drawing the device is shown as it may be made, wherein numeral 1 indicates the thin shell forming the device, numeral 2 a similar shell forming the master cap, and numeral 3 a lipstick case upon which a plurality of said devices may be assembled.

The applicator is preferably made of a relatively thin shell with a flange 4 forming a base, and the shell tapers upward from the base to a point 5, where it is rounded forming a tip. This shell may be made of metal or any suitable material, and may be covered with any substance providing a relatively soft outer surface. In the design shown in Figure 3, in which the end 6 of the shell is formed to represent the tip of a finger, the outer surface is shown as covered with a layer of material 7 similar to the cotton flock, although it is understood that any suitable material may be used, and this is secured to the outer surface of the shell 8 by a layer of lacquer 9, or any suitable adhesive. In this design the lower edge of the shell is rolled to form a bead 10, similar to the flange 4, however, it will be understood that the lower end of the shell may be formed in any manner or any means may be provided for forming a base.

In the design shown in Figure 4 the device is similar to that shown in Figure 1, except that a longitudinal groove 11 is provided in the surface, which extends downward from the tip to the base, providing means for taking up contraction and expansion when the devices are assembled. It will be understood that this groove or pleat may be of any shape or design, and may be provided at any point, or any number of grooves may be provided. Figure 6 shows a similar arrangement, in which the device is provided with a flat side 12 that may also extend from the base upward to the tip, and it will also be understood that this may be of any shape and design, and as many as may be desired may be provided.

The design shown in Figure 5 is similar to that shown in Figure 1 except that the applicator, which is indicated by the numeral 13, is made relatively long and thin, with a relatively small tip 14 at the upper end, and it will be understood that the shape of the device or the length thereof in proportion to the diameter may be varied as may be desired, and the entire design may be changed to make the device adapted for different uses.

In Figure 8 the outer surface of the applicator is tapered very slightly from the base 15 to a point 16, and the surface from the point 16 to the tip 17 is tapered similar to the surface shown in Figure 1, and it will be noted that with this arrangement the cap, or a similar device, may be securely held by the surface between the points 15 and 16; however, it will also be understood that the surface may be provided with a small projection 18 as shown in Figure 9, or any means may be provided for frictionally holding one device upon another, or the cap 2 upon any of the devices.

It will be understood that other changes may be made in the construction without departing from the spirit of the invention. One of which changes may be in the use of other means of forming a bead or base on the said device, another may be in the use of other means of holding a plurality of said devices together to form a stick, and still another may be in the use of other means for forming a suitable surface on the exterior of said device.

The construction will be readily understood from the foregoing description. In use the device may be provided preferably in the design as shown in Figure 1, and a plurality of these devices may be nested as shown in Figure 7, presenting a plurality of rims or rings formed by the bases 4, and the device at the upper end may be covered by the master cap 2 having a smooth outer surface, and it will be noted that, as the device is used, the cap 2 may be removed and may be placed in the opposite end or base, so that the surface of the device will be exposed for use, and after it has been used the cap may be replaced. It will be understood that one device may be used for a relatively long time, however, it may be removed and discarded at any time, and the next device is then fresh and ready for use.

It will also be understood that these devices may be assembled upon a lipstick, as shown in Figure 10, and in this design one of said devices, as indicated by the numeral 18, may be provided with a base 19 that may fit over the lipstick in place of the cap, and a plurality of the said devices may be nested thereon, with the cap 2 on the last one of said devices.

It will also be understood that although this device is particularly shown and described as adapted for use as a spreader for lipstick, it may be used for any other purpose or to spread or massage any other product.

Having thus fully described the invention, what I claim as new, and desire to secure by Letters Patent, is:

1. An applicator of the type adapted to massage the lips or the like, comprising a relatively thin, rigid shell, and a coating of relatively soft material substantially covering the outer surface of said shell.

2. An applicator as described in claim 1, characterized in that it is substantially bullet shaped, having a relatively straight section at the base adapted to telescope over a similar section of another similar applicator, said base also providing holding means therefor.

3. An applicator as described in claim 1, characterized in that it is substantially bullet shaped, having a relatively straight section at the base having a shoulder adapted to telescope over a similar section of another similar applicator, said base also providing holding means therefor, and further characterized by a cap forming a closure, and also in that said straight section may be placed over the end of a lipstick case.

4. An applicator comprising a relatively thin, rigid shell, and a casing of relatively soft material substantially covering the outer surface of said shell.

5. An applicator as described in claim 1, characterized in that it is substantially bullet shaped, having a relatively straight section at the base adapted to telescope into another section, said base also providing holding means therefor, and a flange or bead at the extremity of said base.

6. An applicator as described in claim 1, characterized in that it is substantially cone shaped, adapted to telescope over a similar section of another similar applicator, said applicator providing holding means therefor, and a flange or bead at its base.

7. An applicator as described in claim 1, characterized in that it is substantially bullet shaped having a relatively straight section at the base adapted to telescope over a similar base section, and further characterized by a cap form of closure.

8. An applicator comprising a relatively thin, rigid shell, having a relatively straight section at its base, and the upper portion consisting of a relatively soft material, and further characterized in that the entire structure is substantially bullet shaped.

ARTHUR N. SNYDER.